United States Patent
Lu et al.

(10) Patent No.: US 8,605,799 B2
(45) Date of Patent: Dec. 10, 2013

(54) ESTIMATION OF FREQUENCY OFFSET BETWEEN A BASE STATION AND MOBILE TERMINAL

(75) Inventors: Guoqiang Lu, Kanata (CA); Oskar Mauritz, Johanneshov (SE); Fredrik Huss, Sundbyberg (SE); Henrik Back, Vendelsö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 266 days.

(21) Appl. No.: 13/170,930

(22) Filed: Jun. 28, 2011

(65) Prior Publication Data

US 2013/0003880 A1  Jan. 3, 2013

(51) Int. Cl.
*H04L 25/00* (2006.01)
*H04L 7/00* (2006.01)

(52) U.S. Cl.
USPC .......................................... 375/259; 375/354

(58) Field of Classification Search
USPC ......... 375/316, 322, 324, 326, 340, 346, 347, 375/349, 259, 285, 354
See application file for complete search history.

(56) References Cited

U.S. PATENT DOCUMENTS

| 2004/0202234 | A1 | 10/2004 | Wang | |
| 2007/0160158 | A1* | 7/2007 | Zeng et al. | 375/260 |
| 2009/0073869 | A1* | 3/2009 | Chadha et al. | 370/208 |
| 2011/0124359 | A1* | 5/2011 | Shimomura | 455/507 |
| 2011/0249550 | A1* | 10/2011 | Luz et al. | 370/216 |

FOREIGN PATENT DOCUMENTS

EP  2182690 A1  5/2010

OTHER PUBLICATIONS

NEC, "Test Model for High Speed Train", TSG-RAN Working Group 4 (Radio) meeting #47, pp. 1-2, May 5-9, 2008, Kansas City, USA, R4-081041.
Fujitsu, "eNB performance requirement for high-speed train scenario", 3GPP TSG-RAN WG4 Meeting #47, pp. 1-2, May 5-9, 2008, Kansas City, USA, R4-081100.

* cited by examiner

*Primary Examiner* — Sam K Ahn
*Assistant Examiner* — Vineeta Panwalkar
(74) *Attorney, Agent, or Firm* — Coats and Bennett, P.L.L.C.

(57) ABSTRACT

A method and apparatus for frequency offset estimation exploits the differences in reference symbol timing for different channels to resolve ambiguities in the frequency offset estimation. Based on the initial frequency offset estimates, a hypothesis table is constructed providing hypothesized frequency offsets for each channel for a plurality of possible offset regions. An error metric for each offset region is calculated based on the difference of the hypothesized frequency offsets. The set of hypothesized frequency offsets that minimize the error metric is selected as the final frequency offset estimates.

18 Claims, 5 Drawing Sheets

ESTIMATION OF FREQUENCY OFFSET BETWEEN A BASE STATION AND MOBILE TERMINAL

BACKGROUND

The present invention relates generally to frequency correction in a mobile communication terminal and, more particularly, to the estimation of the frequency offset between a base station and mobile terminal in a mobile communication network.

In mobile telecommunication systems, there is typically frequency offset between the transmitter and the receiver. The frequency offset can be caused by oscillator mismatch in the transmitter and the receiver and/or Doppler shift. Under certain channel conditions, the frequency offset due to Doppler shift can be quite large, i.e. greater than 1 kHz. One scenario where large frequency offsets are expected is the high speed train (HST) scenario as defined in the Third Generation Partnership Project (3GPP) specification TS 36.104 where the user is traveling on a high speed train. Due to large Doppler shift in the HST scenario, the frequency offset can be ±2 kHz for the Evolved Universal Terrestrial Radio Access (E-UTRA) operating band 7 frequency. For the mobile communication systems to work properly, a frequency offset of this magnitude must be estimated and corrected.

Simple and effective algorithms exist to estimate the frequency offset. One common approach estimates the frequency offset based on the phase differences of reference symbols (or pilot symbols). The frequency offset $f_{offset}$ is estimated as the phase difference $\Delta\Phi$ divided by the time interval $\Delta t$ of the pilot symbols, and may be given by:

$$f_{offset} = \frac{\Delta\Phi}{2\pi \times \Delta t}. \quad \text{Eq. (1)}$$

Because the observable phase difference is limited to an absolute value less than $\pi$, the time interval of the pilot symbols determines the maximum frequency offset range that can be estimated. For the Physical Uplink Shared Channel (PUSCH) in LTE systems, the time interval of the reference symbols is 0.5 ms. The maximum frequency offset that can be estimated from PUSCH reference symbols is ±1000 Hz. For the Physical Uplink Control Channel (PUCCH) using format 2/2a/2b, the time interval for the reference symbols is approximately 4/14 ms. The maximum frequency offset that can be estimated from PUCCH reference symbols is thus ±1750 Hz. If the frequency offset is beyond these ranges, the phase differences of the reference symbols will "wrap-around" $\pi$ or $-\pi$. The "wrap-around" frequencies corresponding to the phase differences of ±π are ±1000 Hz for PUSCH and ±1750 Hz for PUCCH.

Figure 1:
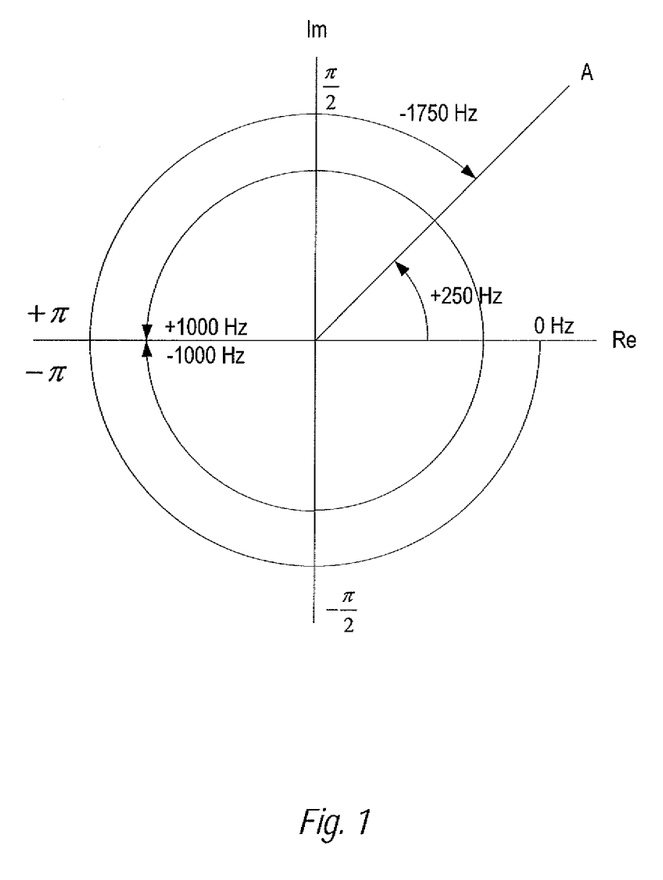
FIG. 1 illustrates the aliasing problem in frequency offset estimation.

The wrap-around effect creates ambiguity in estimating the frequency offset. For example, a frequency offset of −1750 Hz for the PUSCH will cause phase rotation and end up at point A in the complex plane as shown in FIG. 1. Similarly, a frequency offset of +250 Hz will cause a phase rotation of $$\frac{\pi}{4}$$

and end up at the same point in the complex plane. In this example, the −1750 Hz and +250 Hz frequency offsets are indistinguishable. The potential for large frequency offsets beyond the resolvable range thus creates an ambiguity that needs to be resolved to determine the correct frequency offset.

A method for increasing the resolvable range of frequency offsets is described in the patent application WO 2010/060732 "Frequency Offset Estimation" combining two frequency offset estimates on the same received signal. In this disclosure, the two estimates are calculated from pairs of received symbols with different time difference between the first and the last received symbol. However, for each PUSCH and PUCCH format 2/2a/2b there is only one time difference between the reference symbols located in the same part of the spectrum so it is not possible to resolve the ambiguity from a single received signal. Furthermore, the PUSCH and PUCCH cannot be scheduled in the same subframe for the same user and one channel (PUSCH for example) may be scheduled more frequently than the other (PUCCH for example). Thus, there will be instances where there are no fresh raw estimates from both channels. In these cases, a channel has to resolve the ambiguity with its own single raw estimate.

Therefore, new techniques are needed for extending the resolvable range of frequency offsets.

SUMMARY

The present invention provides methods and apparatus for estimating the frequency offset between a transmitter and a receiver. The present invention exploits the differences in reference symbol timing for different channels to resolve ambiguities in the frequency offset estimation. Based on the initial frequency offset estimates, a hypothesis table is constructed providing hypothesized frequency offsets for each channel for a plurality of possible offset regions. An error metric for each offset region is calculated based on the difference between the hypothesized frequency offsets. The set of hypothesized frequency offsets that minimizes the error metric is selected as the final frequency offset estimates.

Exemplary embodiments comprise a method implemented in a receiving node of a wireless network for determining a frequency offset between a transmitting station and a receiving station. In one exemplary method, raw frequency offset estimates are generated for first and second channels having different resolvable ranges. A first hypothesized frequency offset is computed for the first channel and a second hypothesized frequency offset is computed for the second channel for each one of two or more offset regions within an offset range of interest. For each offset region, an error metric is computed as a function of the corresponding hypothesized frequency offsets for the first and second channels. The hypothesized frequency offsets corresponding to the offset region having the lowest error metric are selected as final frequency offset estimates.

Other embodiments of the invention comprise a receiving node in wireless network. The receiving node comprises a receiver front end for receiving signals from a transmitting node over a wireless channel and a processing circuit to estimate a frequency offset between the receiving node and transmitting node. The processing circuit is configured to generate raw frequency offset estimates for first and second channels having different resolvable ranges. The processing circuit computes, from the raw frequency offset estimates, a first hypothesized frequency offset for the first channel and a second hypothesized frequency offset for the second channel for each one of two or more offset regions within a range of interest. The processing circuit then computes an error metric for each offset region as a function of the corresponding hypothesized frequency offsets for the first and second channels. Finally, the processing circuit selects, as final frequency offset estimates, the hypothesized frequency offsets corresponding to the offset region having the lowest error metric.

In some embodiments, the frequency offset selected in a first time interval may be used to select the frequency offset in a subsequent time interval. More particularly, the processing circuit may select a hypothesized frequency offset in a second time interval that is the closest to the selected frequency offset in the first time interval.

The frequency offset estimation techniques herein described expand the resolvable frequency offset range, which allows for more accurate estimation of the frequency offset with only a slight increase in computing resources. More accurate frequency offset estimation paves the way for proper frequency offset compensation, thus ensuring a higher level of throughput performance.

DETAILED DESCRIPTION

Figure 2:
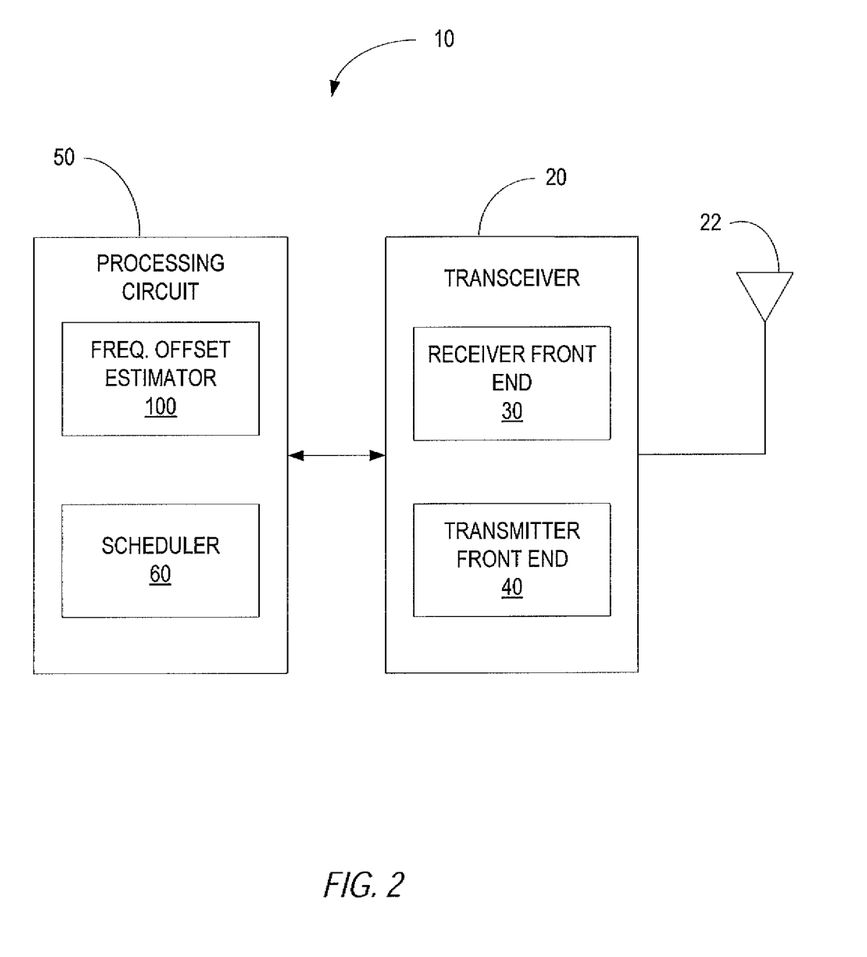
FIG. 2 illustrates an exemplary base station according to one embodiment of the invention including a frequency offset estimator.

FIG. 2 illustrates an exemplary base station 10 according to one exemplary embodiment. Base station 10 is configured to operate according to the Long Term Evolution (LTE) standard by the 3rd Generation Partnership Project (3GPP). Those skilled in the art will appreciate that the principals described herein may be applied to mobile communication networks based on other communication standards including, without limitation, Wideband Co-Division Multiple Access (WCDMA) systems, WiMax systems, and wireless local area networks (WLAN).

Base station 10 comprises a transceiver circuit 20 and processing circuit 50. Transceiver circuit 20 comprises the radio equipment for communicating over the air interface with mobile terminals via antenna 22. The transceiver circuit 20 comprises a receiver front end 30 and transmitter front end 40. Receiver front end 30 downconverts the received signal to baseband frequency, amplifies and filters the received signal, and converts the received signal to digital form for input to the processing circuit 50. Transmitter front end 40 converts signals supplied by the processing circuit 50 to analog form, filters and amplifies the signal, and modulates the signal onto an RF carrier for transmission to the mobile terminal via antenna 22.

The processing circuit 50 performs the digital signal processing for transmitted and received signals, and controls the operation of the base station 10 according to the applicable communication standard. Processing circuit 50 demodulates and decodes the received signals supplied by the receiver front end 30. The processing circuit 50 also encodes and modulates signals to be transmitted to the mobile terminal by the transmitter front end 40. Processing circuit 50 includes a scheduler 60 and a frequency offset estimator 100. The frequency offset estimator 100 estimates a frequency offset between the transmitter at the mobile terminal and the receiver at the base station 10. The frequency offset may be due to variances in the oscillator and Doppler shift. The frequency offset estimator 100 applies frequency correction to correct for the estimated offset. The scheduler 60 handles radio resource management and schedules transmissions to the mobile terminal on the downlink channels, and transmissions from the mobile terminal on the uplink channels. Those skilled in the art will appreciate that the processing circuit 50 performs many other functions which are not essential to the understanding of the present invention.

Figure 3:
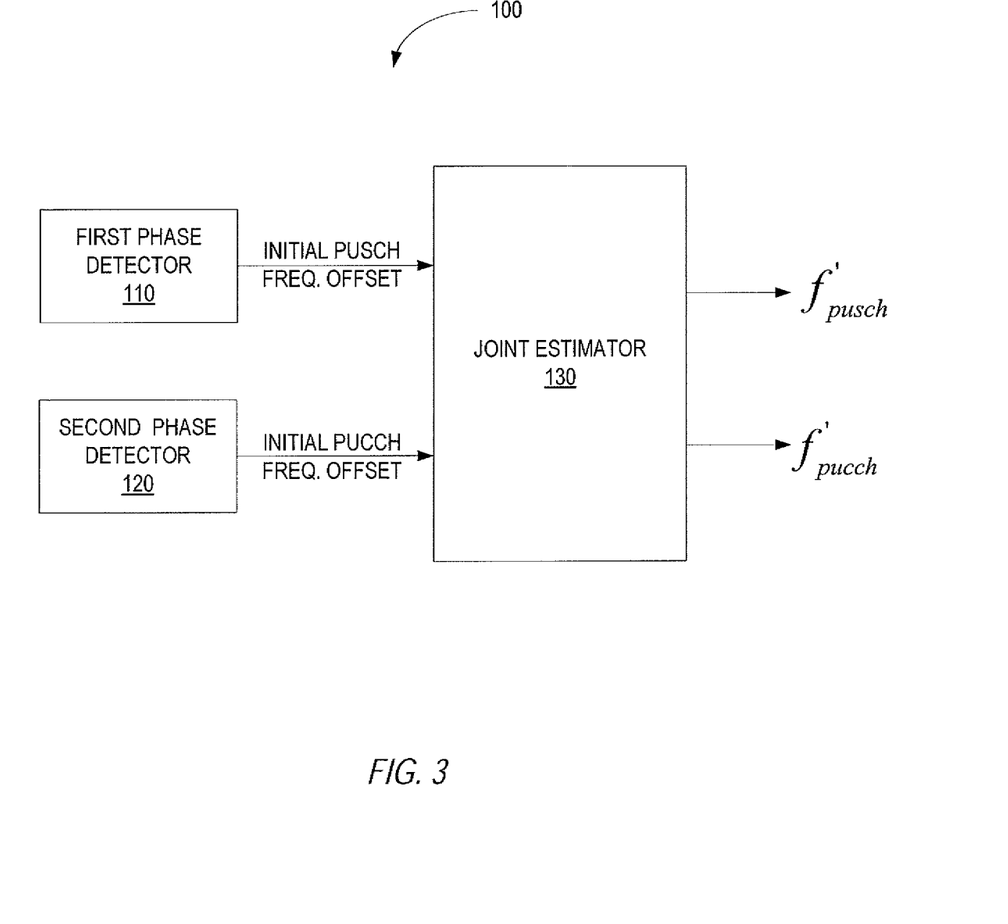
FIG. 3 illustrates the main functional components of the frequency offset estimator.

FIG. 3 illustrates the main functional components of a frequency offset estimator 100 according to one exemplary embodiment. Those skilled in the art will appreciate that the functional components shown in FIG. 3 represent logical functions of the frequency offset estimator 100, rather than physical components. The logical components may be implemented in a microprocessor, application specific integrated circuit (ASIC), or other digital signal processor.

The frequency offset estimator 100 comprises first and second phase detectors 110 and 120, respectively. A first received signal received on a first channel is input to the first phase detector 110, and a second signal received on a second channel is input to the second phase detector 120. In one exemplary embodiment, the first signal is received on the physical uplink shared channel (PUSCH) in an LTE system. The second signal is received on the physical uplink control channel (PUCCH) in an LTE system. The first phase detector 110 generates an initial frequency offset estimate based on the phase difference between PUSCH reference symbols. Similarly, the second phase detector 120 determines an initial frequency offset estimate for the PUCCH based on the phase difference between PUCCH reference symbols. The initial frequency offsets from the phase detectors 110, 120 are applied to a joint estimator 130. Joint estimator 130 resolves ambiguity in the initial frequency offset estimates and generates the final frequency offset estimates for the PUSCH and PUCCH, respectively. The ambiguity in initial frequency offset estimates is resolved using a joint estimation technique as herein described.

The joint estimator 130 exploits the difference in the periodicity of the reference symbols for the two channels considered. Continuing with the LTE example, the time interval of the pilot symbols is 0.5 ms for the PUSCH, which equates to a maximum resolvable frequency offset of ±1000 Hz. For the PUCCH using format 2/2A/2B, the time interval of the reference symbols is approximately 4/14 milliseconds, which equates to a resolvable frequency offset of ±1750 Hz. Wraparound occurs when the actual frequency offset exceeds the maximum resolvable frequency offset. For the PUSCH, the apparent phase shift for a frequency offset of −1750 Hz is the same as a frequency offset of +250 Hz.

Figure 4:
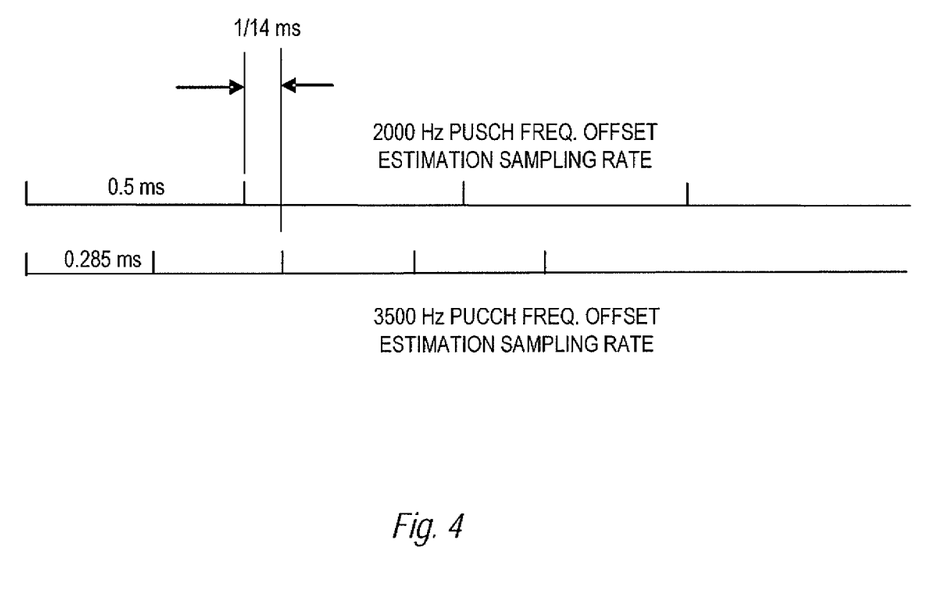
FIG. 4 illustrates how joint estimation extends the resolvable frequency offset range.

Joint estimator 130 considers the initial frequency offsets jointly to resolve the ambiguity of the initial frequency offsets. Under ideal conditions, e.g., assuming that the frequency offset during PUSCH transmission is the same as the frequency offset during PUCCH transmission, the maximum resolvable frequency offset can be expanded to 7000 Hz. FIG. 4 illustrates how joint estimation extends the resolvable frequency offset range. When combining the PUSCH and PUCCH, the minimum change interval will be 1/14 ms, which equals the greatest common factor between the 0.5 ms time interval for PUSCH and the 0.285 ms time interval for the PUCCH. The maximum resolvable frequency offset without aliasing is therefore 14,000/2, which equals 7000 Hz. In practical applications, the PUSCH and PUCCH transmissions happen at different times and with time varying frequency offsets. Thus, the practical maximum resolvable frequency offset will be smaller than 7000 Hz.

The scheduler 60 at the base station 10 schedules PUCCH format 2 and PUSCH transmissions on a regular basis. The transmission intervals of the PUSCH and PUCCH may be different. Typically, the PUSCH has a shorter transmission interval than the PUCCH. The PUSCH and PUCCH provide two different sets of reference symbols for frequency offset estimation. Also, as previously noted, the resolvable frequency offset range for the PUCCH and PUSCH are different due to the different reference symbol timing.

The frequency offset estimation procedure can be broken down into four basic steps. In the first step, initial frequency offset estimates are generated for the PUSCH and PUCCH, e.g., by the first and second phase detectors 110, 120. The initial frequency offset estimates may be determined in a conventional manner by measuring the phase difference of the reference symbols. That is, the frequency offset for the PUSCH is determined by measuring the phase difference of the PUSCH reference symbols and the initial frequency offset for the PUCCH is made by measuring the phase difference of the PUCCH reference symbols. The initial frequency estimates will fall within the respective resolvable ranges for the PUSCH and PUCCH. Thus, the initial frequency offset estimate for the PUSCH will be ±1000 Hz and the initial frequency offset estimate for the PUCCH will be ±1750 Hz. The initial frequency offset estimates may be averaged over time to improve the robustness against noise.

The second step of the frequency offset estimation procedure is the construction of a hypothesis table. The hypothesis table divides the frequency offset range of [0,7000] Hz into 10 offset regions as shown in Table 1 below.

TABLE 1

Offset Regions

| Index of hypothesis regions: $i_h$ | PUSCH wrap-around number: $n_{pusch}^{wrap}$ | PUCCH wrap-around number: $n_{pucch}^{wrap}$ | Hypothesis absolute value frequency offset range: $\tilde{f}_{range}$ |
|---|---|---|---|
| 0 | 0 | 0 | (0, 1000) |
| 1 | 1 | 0 | (1000, 1750) |
| 2 | 1 | 1 | (1750, 2000) |
| 3 | 2 | 1 | (2000, 3000) |
| 4 | 3 | 1 | (3000, 3500) |
| 5 | 3 | 2 | (3500, 4000) |
| 6 | 4 | 2 | (4000, 5000) |
| 7 | 5 | 2 | (5000, 5250) |
| 8 | 5 | 3 | (5250, 6000) |
| 9 | 6 | 3 | (6000, 7000) |

The boundaries between the offset regions are integer multiples of the wrapping thresholds for the PUSCH and/or PUCCH. As previously noted, the wrapping threshold for the PUSCH is ±1000 Hz and the wrapping threshold for the PUCCH is ±1750 Hz. Each offset region corresponds to a predetermined number of wraps, i.e. the wrap-around number, for the PUSCH and PUCCH. Table 1 gives the wrap-around number for each offset region for the PUSCH and PUCCH, where the combination of wrap-around numbers for the PUSCH and PUCCH is unique in each offset region. Based on the initial frequency offset estimates, the wrap-around numbers, and the wrapping threshold, hypothesized frequency offsets for the PUSCH and PUCCH can be derived for each offset region The third step of the frequency offset estimation procedure is to compute an error metric for each offset region. Assuming that the actual frequency offset for the PUSCH and PUCCH is the same, the hypothesized frequency offsets for the PUCCH and PUSCH in any given offset region would be equal. In practice, there is likely to be some variance between the frequency offset estimates for the PUSCH and PUCCH. Accordingly, embodiments of the present invention use an error metric based on the difference between the hypothesized frequency offsets for the PUSCH and PUCCH. In some embodiments, the error metric may also take into account a difference between the hypothesized frequency offset for the PUSCH (or PUCCH) in the current transmission interval and the final frequency offset for the preceding transmission interval. The computation of the error metrics is described in greater detail below.

The final step of the frequency offset estimation procedure is to select final frequency offset estimates from the set of hypothesized estimates. In some embodiments, the final frequency offset estimates will be the set of hypothesized frequency offsets that minimize the error metric.

The PUSCH is normally scheduled more often than PUCCH. When there is no new raw PUCCH frequency offset estimates, the PUSCH frequency offset is chosen from its hypothesis table with the one whose value is the closest to previous ambiguity resolved PUSCH frequency offset estimate.

An exemplary procedure for frequency offset estimation will now be described in more detail. The description uses the following definitions:

$f^{actual}$: Actual frequency offset in Hz $f^{wrap\_thresh}$: A positive number with a unit of Hz denoting the wrap around threshold of frequency offset. $f_{pusch}^{wrap\_thresh}=1000$ Hz, $f_{pusch}^{wrap\_thresh}=1750$ Hz. This frequency offset threshold corresponds to a phase shift of $\pi$ during the observation interval. If $|f^{actual}|>f^{wrap\_thresh}$, the phase shift it causes during the observation interval will be larger than $\pi$, i.e., a wrap-round has happened $n^{wrap}$: The number of wrap-around that will happen given a frequency offset $\hat{f}$: The raw frequency offset estimate. Instantaneous frequency offset estimate in the range of $(-f^{wrap\_thresh},0)$ or $(0,f^{wrap\_thresh})$ $\check{f}$: Vector containing the hypothesized estimates of the actual frequency offset based on the triplet: $\hat{f}$, $f^{wrap\_thresh}$ and hypothesis of $n^{wrap}$ $\tilde{f}$: The unwrapped value of raw frequency offset chosen from $\check{f}$ $f'$: Ambiguity resolved frequency offset estimate $f'^{k-1}$: Previous ambiguity resolved frequency offset estimate The definitions apply to both the PUSCH and PUCCH, which are distinguished by adding subscript $_{pusch}$ or $_{pucch}$.

The hypothesized frequency offset for the PUSCH and PUCCH for each offset region can be computed by first computing $\check{f}_{tmp}$ from the raw frequency offset estimate according to:

$$\check{f}_{tmp} = \hat{f} - \text{sgn}(\hat{f}) \times \text{mod}(n^{wrap}, 2) \times 2 \times f^{wrap\_thresh}. \qquad \text{Eq. (2)}$$

Once $\check{f}_{tmp}$ is known, the hypothesized frequency offset can be computed according to:

$$\check{f} = \check{f}_{tmp} + \text{sgn}(\check{f}_{tmp}) \times \lfloor n^{wrap}/2 \rfloor \times 2 \times f^{wrap\_thresh}. \qquad \text{Eq. (3)}$$

In PUSCH subframes where new PUCCH raw frequency offset estimates are available since the last PUSCH transmission, new hypothesized frequency offsets are computed for both the PUSCH and PUCCH. Hypothesized frequency offsets for the PUSCH are computed for an offset region $i_h$ according to:

$$\check{f}_{tmp\_pusch} = \hat{f}_{pusch} - \text{sgn}(\hat{f}_{pusch}) \times \text{mod}(n_{pusch}^{wrap}(i_h), 2) \times 2 \times f_{pusch}^{wrap\_thresh} \quad \text{Eq. (4)}$$

$$\check{f}_{pusch}(i_h) = \check{f}_{tmp\_pusch} + \text{sgn}(\check{f}_{tmp\_pusch}) \times \lfloor n_{pusch}^{wrap}(i_h)/2 \rfloor \times 2 \times f_{pusch}^{wrap\_thresh} \quad \text{Eq. (5)}$$

Hypothesized frequency offsets for the PUCCH are computed for each offset region $i_h$ according to:

$$\check{f}_{tmp_{pucch}} = \hat{f}_{pucch} - \text{sgn}(\hat{f}_{pucch}) \times \text{mod}(n_{pucch}^{wrap}(i_h), 2) \times 2 \times f_{pucch}^{wrap\_thresh} \quad \text{Eq. (6)}$$

$$\check{f}_{pucch}(i_h) = \check{f}_{tmp\_pucch} + \text{sgn}(\check{f}_{tmp\_pucch}) \times \lfloor n_{pucch}^{wrap}(i_h)/2 \rfloor \times 2 \times f_{pucch}^{wrap\_thresh} \quad \text{Eq. (7)}$$

Next, an error metric $E_h$ is computed for each offset region. In one exemplary embodiment, the error metric $E_h$ is given by:

$$E_h = (|\check{f}_{pusch}(i_h) - \check{f}_{pucch}(i_h)| + \beta \cdot |\check{f}_{pusch}(i_h) - f'_{pusch}{}^{k-1}|) \quad \text{Eq. (8)}$$

The first term of the error metric is a difference between the hypothesized frequency offsets for the PUSCH and PUCCH. The second term is the difference between the hypothesized frequency offsets for the current and preceding PUSCH subframes. The coefficient β is a predetermined weighting factor. Those skilled in the art will appreciate that the use of the second term in Eq. 8 is optional. Next, the offset region that minimizes the error metric is found:

$$i_h^{min} = \underset{i_h \in [0,1,2,\ldots 9]}{\arg\min} (E_h). \quad \text{Eq. (9)}$$

The final frequency offset estimates are then given by:

$$f'_{pusch} = \check{f}_{pusch}(i_h^{min}) \quad \text{Eq. (10)}$$

$$f'_{pucch} = \check{f}_{pucch}(i_h^{min}) \quad \text{Eq. (11)}$$

In PUSCH subframes without new PUCCH raw frequency offset estimates, a new hypothesized frequency offset is computed only for the PUSCH in each offset region according to Eqs. (4) and (5). Next, an error metric $E_h$ is computed for each offset region. In one exemplary embodiment, the error metric $E_h$ is given by:

$$E_h = (|\check{f}_{pusch}(i_h) - f'_{pusch}{}^{k-1}|). \quad \text{Eq. (12)}$$

Next, the offset region that minimizes the error metric is found according to Eq. (9). The new frequency offset estimate for the PUSCH is then given by Eq. (10).

In new PUCCH subframes, new hypothesized frequency offsets may be computed for each offset region $i_h$ according to Eqs. (6) and (7). Next, an error metric $E_h$ is computed for each offset region. In one exemplary embodiment, the error metric $E_h$ is given by:

$$E_h = (|\check{f}_{pucch}(i_h) - f'_{pucch}{}^{k-1}|). \quad \text{Eq. (13)}$$

Next, the offset region that minimizes the error metric is found according to Eq. (9). The new frequency offset estimate for the PUCCH is then given by Eq. (11).

In the procedure described above, the frequency ambiguity is resolved in PUSCH subframes with new PUCCH raw frequency offset estimates. In these subframes, the error metric takes into account the differences between the hypothesized frequency offsets for the PUSCH and PUCCH. The hypothesized frequency offsets in the offset region that minimizes the error metric are likely to be the correct estimates.

The general procedure described above works with frequency offsets up to 7000 Hz. In LTE applications, the expected frequency offset is expected to be much lower than 7000 Hz. With a smaller frequency offset, the maximum wrap-around number is smaller, resulting in a smaller hypothesis table. Fewer hypotheses reduce complexity and improve the algorithm robustness. For a band 7 frequency, it can be assumed that the maximum frequency offset is below 2000 Hz. Thus, the hypothesis table reduces to three offset regions. The computation of hypothesized frequency offsets for each offset region simply to:

For the PUSCH $$\check{f}_{pusch}(0) = \hat{f}_{pusch} \quad \text{Eq. (14)}$$

$$\check{f}_{pusch}(1) = \hat{f}_{pusch} - \text{sgn}(\hat{f}_{pusch}) \cdot 2000 \quad \text{Eq. (15)}$$

$$\check{f}_{pusch}(2) = \hat{f}_{pusch} - \text{sgn}(\hat{f}_{pusch}) \cdot 2000 \quad \text{Eq. (16)}$$

For the PUCCH $$\check{f}_{pucch}(0) = \hat{f}_{pucch} \quad \text{Eq. (17)}$$

$$\check{f}_{pucch}(1) = \hat{f}_{pucch} \quad \text{Eq. (18)}$$

$$\check{f}_{pucch}(2) = \hat{f}_{pucch} - \text{sgn}(\hat{f}_{pucch}) \cdot 3500 \quad \text{Eq. (19)}$$

In PUSCH subframes with new PUCCH raw frequency estimates, new hypothesized frequency offsets are computed according to Eqs. (14)-(19). An error metric for each offset region is then computed according to Eq. (8) and the offset region that minimizes the error metric is selected according to Eq. (9). The final frequency offset estimates for the PUSCH and PUCCH are then given by Eqs. (10) and (11), respectively.

In PUSCH subframes without new PUCCH raw frequency estimates, new hypothesized frequency offsets are computed only for the PUSCH according to Eqs. (14)-(16). An error metric for each offset region is then computed according to Eq. (12) and the offset region that minimizes the error metric is selected according to Eq. (9). The final frequency offset estimate for the PUSCH is then given by Eq. (10).

In PUCCH subframes, new hypothesized frequency offsets are computed for the PUCCH according to Eqs. (17)-(19). An error metric for each offset region is then computed according to Eq. (13) and the offset region that minimizes the error metric is selected according to Eq. (9). The final frequency offset estimate for the PUCCH is then given by Eq. (11).

For band 1 frequency, the maximum frequency offset may be assumed to be below 1750 Hz. In this case, there is no wrap-around in the PUCCH frequency offset estimates and the hypothesis table reduces to two offset regions. The hypothesized frequency offsets for the PUSCH are given by Eqs. (14) and (15). The hypothesized frequency offsets for the PUCCH are given by Eqs. (17) and (18).

In PUSCH subframes with new PUCCH raw frequency estimates, new hypothesized frequency offsets are computed according to Eqs. (14)-(15) and Eqs. (17)-(18). An error metric for each offset region is then computed according to Eq. (8) and the offset region that minimizes the error metric is selected according to Eq. (9). The final frequency offset estimates for the PUSCH and PUCCH are then given by Eqs. (10) and (11) respectively.

In PUSCH subframes without new PUCCH raw frequency estimates, new hypothesized frequency offsets are computed only for the PUSCH according to Eqs. (14)-(15). An error metric for each offset region is then computed according to Eq. (12) and the offset region that minimizes the error metric is selected according to Eq. (9). The final frequency offset estimate for the PUSCH is then given by Eq. (10).

In PUCCH subframes, new hypothesized frequency offsets are computed for the PUCCH according to Eqs. (17)-(18). An error metric for each offset region is then computed according to Eq. (13) and the offset region that minimizes the error metric is selected according to Eq. (9). The final frequency offset estimate for the PUSCH is then given by Eq. (11).

Figure 5:
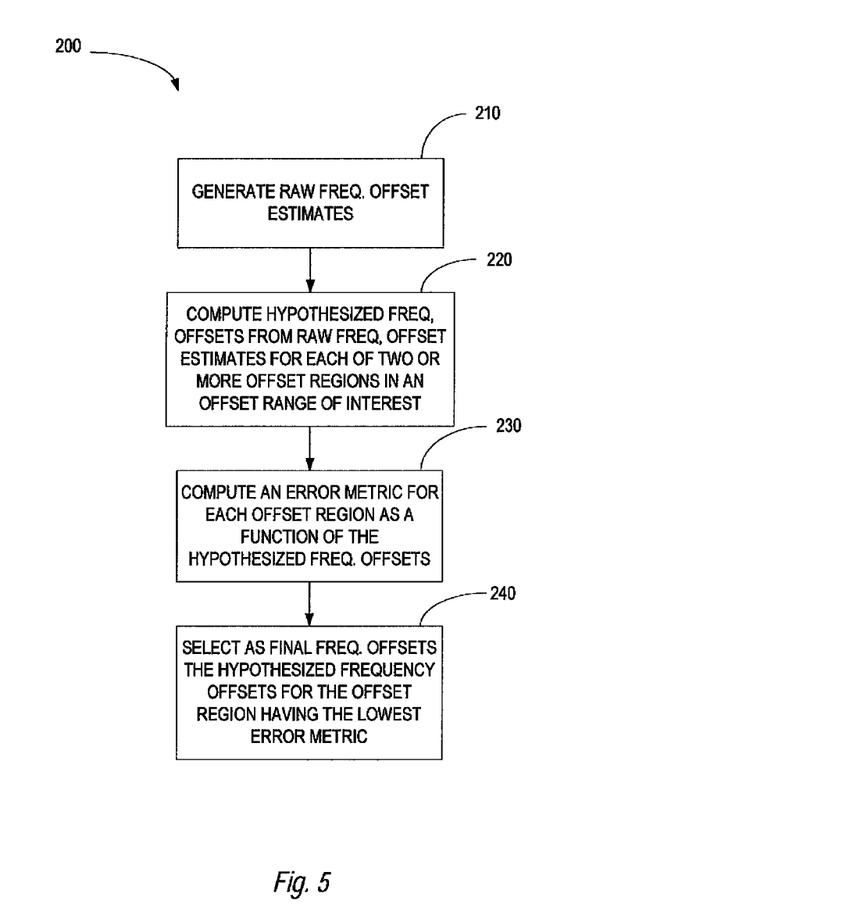
FIG. 5 illustrates an exemplary method according to one embodiment.

FIG. 5 illustrates a generalized form of the joint estimation procedure 200 as herein described. The procedure 200 shown in FIG. 5 begins with the generation of raw frequency offset estimates for first and second channels having different resolvable ranges (block 210). Hypothesized frequency offsets are then computed from the raw frequency offset estimates for each one of two or more offset regions in an offset range of interest (block 220). For each offset region, an error metric is computed as a function of the corresponding hypothesized frequency offsets for the first and second channels (block 230). The set of hypothesized frequency offsets that minimizes the error metric is then selected as the final frequency offset estimates (block 240).

The embodiments described herein expand the resolvable frequency offset range, which allows for more accurate estimation of the frequency offset under HST conditions in LTE. More accurate frequency offset estimation paves the way for proper frequency offset compensation, thus ensuring a certain level of throughput performances. The embodiments described herein require very little extra computing resource to implement.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of determining a frequency offset between a transmitting station and a receiving station, the method comprising:
    generating raw frequency offset estimates for first and second channels between the transmitting station and the receiving station, said first and second channels having different resolvable ranges;
    computing, from the raw frequency offset estimates, a first hypothesized frequency offset for the first channel and a second hypothesized frequency offset for the second channel for each one of two or more offset regions within an offset range of interest;
    computing, for each offset region, an error metric as a function of the corresponding hypothesized frequency offsets for the first and second channels; and
    selecting, as final frequency offset estimates, the hypothesized frequency offsets corresponding to the offset region having the lowest error metric.

2. The method of claim 1 wherein computing the first and second hypothesized frequency offsets for each one of two or more offset regions within a region range of interest comprises:
    determining, for each channel, a wrapping threshold;
    determining from the wrapping thresholds the offset regions and corresponding wrap-around numbers for the first and second channels such that the combination of wrap-around numbers for the first and second channels is unique in each offset region; and
    computing, for each offset region, the hypothesized frequency offsets for the first and second channels from the raw frequency offset estimates, the wrapping thresholds, and the number of wraps.

3. The method of claim 1 wherein generating raw frequency offset estimates for first and second channels comprises measuring a phase difference of reference signals transmitted on said channels.

4. The method of claim 1 wherein computing the error metric for each offset region comprises:
    computing a first difference between the hypothesized frequency offsets for the first and second channels in a first time interval; and
    computing the error metric as a function of the first difference.

5. The method of claim 4 wherein computing the error metric for each offset region further comprises:
    computing a second difference between the hypothesized frequency offset for the first channel in the first time interval and a final frequency offset for the first channel in a second time interval prior to the first time interval; and
    computing the error metric as a weighted sum of the first and second differences.

6. The method of claim 4 further comprising:
    computing, for a second time interval, hypothesized frequency offsets for the first channel for each one of two or more offset regions within the range of interest;
    computing, for the second time interval, a second error metric from the hypothesized frequency offsets for the first channel in the second time interval and a final frequency offset estimate for the first channel in the first time interval; and
    selecting, for the second time interval, the hypothesized frequency offset with the lowest second error metric.

7. The method of claim 4 further comprising:
    computing, for a second time interval, hypothesized frequency offsets for the second channel for one or more offset regions within the range of interest;
    computing, for the second time interval, a second error metric from the hypothesized frequency offsets for the second channel in the second time interval and a final frequency offset estimate for the second channel in the first time interval; and
    selecting, for the second time interval, the hypothesized frequency offset with the lowest second error metric.

8. The method of claim 1 in a Long Term Evolution (LTE) network wherein the first channel comprises the Physical Uplink Shared Channel and the second channel comprises the Physical Uplink Control Channel.

9. The method of claim 1 in a Long Term Evolution (LTE) network, wherein the first channel comprises the Physical Uplink Shared Channel (PUSCH) and the second channel comprises the Physical Uplink Control Channel (PUCCH).

10. A receiving node in a mobile communication network, said network node comprising:
    a receiver front end for receiving signals over a wireless channel transmitted from a transmitting node; and
    a processing circuit connected to said receiver front end to estimate a frequency offset between the receiving node and a transmitting node, said processing circuit comprising a frequency offset estimator configured to:
        generate raw frequency offset estimates for first and second channels between the transmitting station and the receiving station, said first and second channel having different resolvable ranges;
        compute, from the raw frequency offset estimates, a first hypothesized frequency offset for the first channel and a second hypothesized frequency offset for the second channel for each one of two or more offset regions within a ion range of interest;
        compute, for each offset region, an error metric as a function of the corresponding hypothesized frequency offsets for the first and second channels; and select, as final frequency offset estimates, the hypothesized frequency offsets corresponding to the offset region having the lowest error metric.

11. The receiving node of claim 10 wherein the frequency offset estimator is configured to compute the first and second hypothesized frequency offsets for each one of two or more offset regions within the range of interest by:
   determining, for each channel, a wrapping threshold;
   determining from the wrapping thresholds, the offset regions and corresponding wrap-around numbers for the first and second channels such that the combination of wrap-around numbers for the first and second channels is unique in each offset region; and
   computing, for each offset region, the hypothesized frequency offsets for the first and second channels from the raw frequency offset estimates, the wrapping thresholds, and the number of wraps.

12. The receiving node of claim 10 wherein said frequency offset estimator is configured to generate raw frequency offset estimates for first and second channels by measuring a phase difference of reference signals transmitted on said channels.

13. The receiving node of claim 10 wherein said frequency offset estimator is configured to compute the error metric for each offset region as a function of the hypothesized frequency offsets for the first and second channels by:
   computing a first difference between the hypothesized frequency offsets for the first and second channels in a first time interval; and
   computing the error metric as a function of the first difference.

14. The receiving node of claim 13 wherein the frequency offset estimator is configured to compute the error metric for each offset region by:
   computing a second difference between the hypothesized frequency offset for the first channel in the first time interval and a final frequency offset for the first channel in a second time interval prior to the first time interval; and
   computing the error metric as a weighted sum of the first and second differences.

15. The receiving node of claim 13 wherein the frequency offset estimator is configured to compute the error metric for each offset region by:
   computing, for a second time interval, hypothesized frequency offsets for the first channel for each one of two or more offset regions within a region of interest;
   computing, for the second time interval, a second error metric from the hypothesized frequency offsets for the first channel in the second time interval and a final frequency offset estimate for the first channel in the first time interval; and
   selecting, for the second time interval, the hypothesized frequency offset with the lowest second error metric.

16. The receiving node of claim 13 wherein the frequency offset estimator is configured to compute the error metric for each offset region by:
   computing, for a second time interval, hypothesized frequency offsets for the second channel for one or more offset regions within a region of interest;
   computing, for the second time interval, a second error metric from the hypothesized frequency offsets for the second channel in the second time interval and a final frequency offset estimate for the second channel in the first time interval; and
   selecting, for the second time interval, the hypothesized frequency offset with the lowest second error metric.

17. The receiving node of claim 10 in a Long Term Evolution (LTE) network wherein the first channel comprises the Physical Uplink Shared Channel and the second channel comprises the Physical Uplink Control Channel.

18. The receiving node of claim 10 configured for a Long Term Evolution (LTE) network wherein the wherein the first channel comprises the Physical Uplink Shared Channel (PUSCH) and the second channel comprises the Physical Uplink Control Channel (PUCCH).

* * * * *